United States Patent
Feng et al.

(10) Patent No.: US 12,067,731 B2
(45) Date of Patent: Aug. 20, 2024

(54) IMAGE FOREGROUND SEGMENTATION ALGORITHM BASED ON EDGE KNOWLEDGE TRANSFORMATION

(71) Applicant: ZHEJIANG UNIVERSITY, Zhejiang (CN)

(72) Inventors: Zunlei Feng, Hangzhou (CN); Lechao Cheng, Hangzhou (CN); Jie Song, Hangzhou (CN); Li Sun, Hangzhou (CN); Mingli Song, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 353 days.

(21) Appl. No.: 17/586,806

(22) Filed: Jan. 28, 2022

(65) Prior Publication Data

US 2022/0148194 A1 May 12, 2022

Related U.S. Application Data

(63) Continuation of application No. PCT/CN2021/101127, filed on Jun. 21, 2021.

(30) Foreign Application Priority Data

Aug. 10, 2020 (CN) .......................... 202010794931.9

(51) Int. Cl.
*G06T 7/194* (2017.01)
*G06T 3/02* (2024.01)
(Continued)

(52) U.S. Cl.
CPC ................ *G06T 7/194* (2017.01); *G06T 3/02* (2024.01); *G06T 7/12* (2017.01); *G06T 7/174* (2017.01);
(Continued)

(58) Field of Classification Search
CPC .. G06T 7/194; G06T 7/12; G06T 3/02; G06T 2207/20081; G06T 2207/20084
See application file for complete search history.

(56) References Cited

U.S. PATENT DOCUMENTS 10,115,197 B1 10/2018 Alsmadi
10,430,946 B1 10/2019 Zhou et al.
(Continued)

FOREIGN PATENT DOCUMENTS

| CN | 1838173 B | * 1/2012 | ........... G06T 7/0083 |
| CN | 107305691 A | 10/2017 | |

(Continued)

OTHER PUBLICATIONS

Y. Fan, "The Trend of Image Segmentation 3 Research: An Overview Based on Traditional, Supervised and Semi-supervised Methods," 2020 International Conference on Computing and Data Science (CDS), Stanford, CA, USA, 2020, pp. 152-155, doi: 10.1109/CDS49703.2020.00037. (Year: 2020).*

(Continued)

*Primary Examiner* — Michael Robert Cammarata
(74) *Attorney, Agent, or Firm* — W&G Law Group

(57) ABSTRACT

An image foreground segmentation algorithm based on edge knowledge transformation includes the following steps: 1) construction of an image segmentation framework with edge self-supervised mechanism; 2) construction of an inner edge and outer edge discriminator; 3) generation of pseudo-segmented triplet data; 4) two edge adversary foreground segmentation guided by a very few labeled samples of the target category. According to the image foreground segmentation algorithm based on edge knowledge transformation established in the above steps, under the guidance of a very small number of labeled segmentation samples of the target category, the inner and outer edge discrimination network transforms edge knowledge of a large amount of open- (Continued)

source labeled data of a non-target category into a foreground segmentation network for the target category image by the way of adversary of segmentation results, and realize the segmentation of foreground target category objects of the image.

3 Claims, 1 Drawing Sheet

(51) Int. Cl.
  *G06T 7/12* (2017.01)
  *G06T 7/174* (2017.01)
(52) U.S. Cl.
  CPC ............... *G06T 2207/20081* (2013.01); *G06T 2207/20084* (2013.01)

(56) References Cited

U.S. PATENT DOCUMENTS

| | | | |
|---|---|---|---|
| 2019/0347804 A1* | 11/2019 | Kim | G06T 7/194 |
| 2020/0082540 A1 | 3/2020 | Roy Chowdhury et al. | |
| 2021/0081719 A1* | 3/2021 | Banerjee | H04N 21/854 |
| 2021/0166396 A1* | 6/2021 | Chen | G06V 20/46 |

FOREIGN PATENT DOCUMENTS

| | | |
|---|---|---|
| CN | 110070483 A | 7/2019 |
| CN | 110619632 A | 12/2019 |
| CN | 111192279 A | 5/2020 |
| CN | 111310582 A | 6/2020 |
| CN | 111462162 A | 7/2020 |
| CN | 112990222 A | 6/2021 |
| IN | 112001939 A | 11/2020 |

OTHER PUBLICATIONS

Peng, Jizong, et al. "Discretely-constrained deep network for weakly supervised segmentation." Neural Networks 130 (2020): 297-308 (Year: 2020).*
H. Kervadec, J. Dolz, M. Tang, E. Granger, Y. Boykov, I. Ben Ayed, Constrained-CNN losses for weakly supervised segmentation, Medical image analysis 54 (2019) 88{99 (Year: 2019).*
Zhou, Sanping, et al. "Se2net: Siamese edge-enhancement network for salient object detection." arXiv preprint arXiv: 1904.00048 (2019). (Year: 2019).*
Pathak, Deepak, Philipp Krahenbuhl, and Trevor Darrell. "Constrained convolutional neural networks for weakly supervised segmentation." Proceedings of the IEEE international conference on computer vision. 2015. (Year: 2015).*
International Search Report (PCT/CN2021/101127); Date of Mailing: Sep. 22, 2021.
Notice Of Allowance(202010794931.9); Date of Mailing: Feb. 9, 2021.
Visual Boundary Knowledge Translation for Foreground Segmentation; Date of Mailing: May 18, 2021.
Edge-competing Pathological Liver Vessel Segmentation with Limited Labels; Date of Mailing: May 18, 2021.
Semi-Supervised Semantic Segmentation Using Adversarial Learning for Pavement Crack Detection; Date of Mailing: Mar. 11, 2020.
Bitewing Radiography Image Segmentation Based on Conditional Generative Adversarial Network; Date of Mailing: Apr. 30, 2019.

* cited by examiner

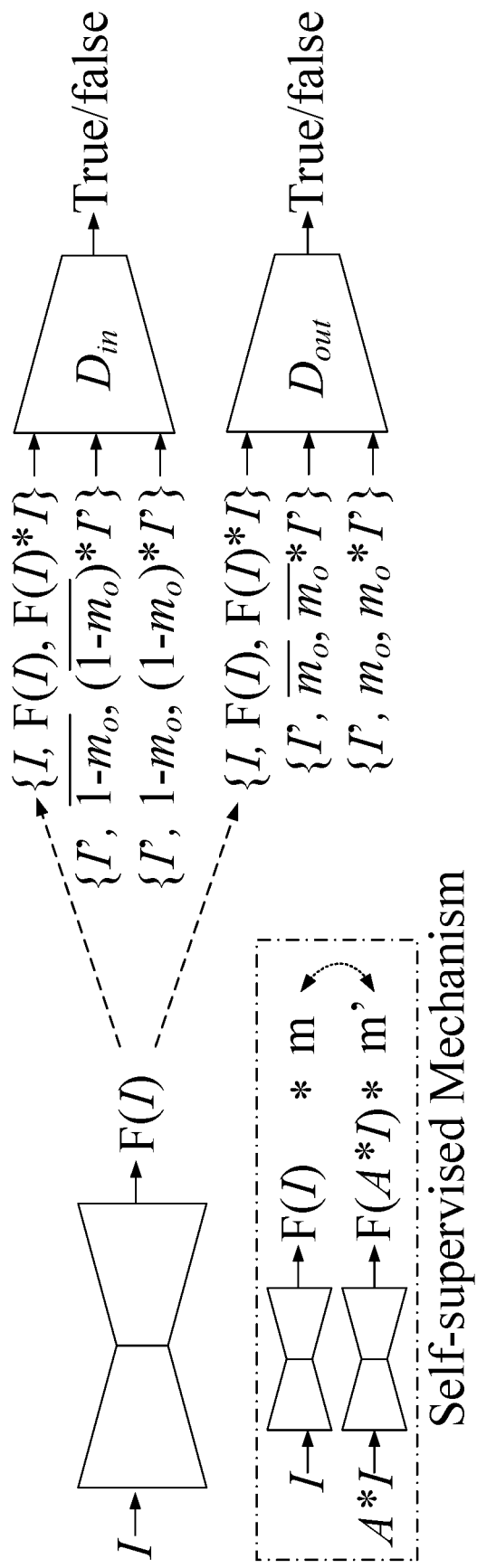

IMAGE FOREGROUND SEGMENTATION ALGORITHM BASED ON EDGE KNOWLEDGE TRANSFORMATION

CROSS-REFERENCE TO RELATED APPLICATIONS

The present application is a continuation of International Application No. PCT/CN2021/101127, filed on Jun. 21, 2021, which claims priority to Chinese Application No. 202010794931.9, filed on Aug. 10, 2020, the contents of both of which are incorporated herein by reference in their entireties.

TECHNICAL FIELD

The present application belongs to the field of image segmentation. In view of the shortcomings of the image foreground segmentation method based on deep learning that a large number of samples need to be labeled and the problem that the existing segmentation network based on deep learning needs to have the ability to identify categories and the network capacity is occupied, the present application proposes an image foreground segmentation algorithm based on edge knowledge transformation, which imitates the ability of human eyes to segment images only through the edges of objects without knowing the category information of foreground objects. On the basis of obtaining the edge knowledge of a large number of open-source image segmentation data sets of a non-target category, the foreground segmentation of images guided by a very few labeled samples is completed by using a very few supervised constraints of labeled images of the target category in combination with an edge-aware self-supervised module.

BACKGROUND

With the continuous development of computer technology, deep learning technology has made breakthrough progress in various fields of computer. However, the successful application of existing deep learning technologies mostly depends on a large amount of labeled data. In order to overcome the shortage that a large amount of labeled data is needed for training a depth network, many researchers have carried out related research work, such as unsupervised learning, small sample learning, transfer learning, semi-supervised learning and so on. In the field of image segmentation, the above methods for labeling a large number of samples have their own shortcomings. Unsupervised image segmentation methods have uncontrollable problems, which parts or categories need to be segmented cannot be controlled, while unsupervised image segmentation methods need to design unsupervised segmentation techniques according to specific segmentation scenes; the image segmentation method based on small sample learning aims at less than five labeled samples of a new category and labeled data of other categories to realize image segmentation guided by a few samples. However, the image segmentation method based on small sample learning still cannot achieve satisfactory segmentation effects, and there is still a big gap with the fully supervised image segmentation method. The image segmentation method based on transfer learning needs an image data set similar to the target category. On the basis of a pre-training segmentation network with a large number of data samples in a similar category, a few target samples are used to segment the new image category. However, this method needs image samples of a similar category to be very similar to those of the target category, and the migration effect is poor when there are few target samples. The semi-supervised image segmentation method can realize image segmentation based on partially labeled samples in combination with partially unlabeled samples. However, the semi-supervised image segmentation method still needs a large number of labeled samples, which cannot greatly reduce the labeling cost.

Based on the scene of image segmentation, the existing image segmentation methods can be divided into foreground segmentation, target segmentation, semantic segmentation, instance segmentation, panoramic segmentation and other methods. The foreground segmentation method mainly realizes the recognition and effective segmentation of foreground objects in an image; the target segmentation is mainly used to segment the part corresponding to the target in an image; the semantic segmentation uses the labeling constraint of category semantics to realize image segmentation by classifying different categories of objects in the image at the pixel level; the instance segmentation mainly realizes the segmentation of each object in the image, and it is necessary to classify at the pixel level and locate different instances at the same time, even if they are in the same category; the panoramic segmentation combines semantic segmentation and instance segmentation, and achieves segmentation of all objects in the image by classifying each pixel in the image.

In the task of image segmentation, the human visual system does not need to know the category of the object when segmenting the object, but can realize the accurate segmentation of the object only by the edge information of the object. However, the existing related image segmentation methods all need labeling information corresponding to the category of the object to constrain the segmentation of objects in an image. In these methods the information of objects or categories needs to be known when segmenting, which takes up the ability of network segmentation. The edge information of objects in the image segmentation task is the main basis of the segmentation methods. At present, there are some segmentation methods based on the edge of objects in the image. However, these methods only use the edge information of the image as an aid to the image segmentation task. For example, a new branch is built in the image segmentation network to predict the contour information of the object. By predicting the contour information, the edge segmentation ability of the image segmentation network can be effectively enhanced. However, in this kind of method, there is still the problem that the network segmentation ability is occupied. The image foreground segmentation algorithm based on edge knowledge transformation proposed by the present application can effectively solve this problem.

In addition, another technology related to the present application is the image segmentation method based on an adversarial network, which is mainly divided into two categories: segmentation methods based on the adversarial distribution of segmentation results and methods based on authenticity of segmentation puzzles. The segmentation method based on the adversarial distribution of segmentation result takes the real image segmentation result as the real samples, and the image results to be segmented as the pseudo segmentation results, and continuously improves the segmentation results through adversarial manner. This kind of method can effectively learn the consistency of the distribution of segmentation results to realize the image segmentation task; based on the method of segmentation puzzle authenticity, the segmented image object parts are spliced into a new background image, and then input into the authenticity discrimination network, so as to achieve more accurate image segmentation through the adversary between the spliced composite image and the real image. However, the former still needs a large number of labeled samples, while the latter cannot solve the problem of object segmentation in complex scenes, and there is a problem that the segmented objects are partially uncontrollable.

SUMMARY

The present application aims to solve the problem that the current image foreground segmentation method based on deep learning needs a lot of labeling, and provides an image foreground segmentation algorithm based on edge knowledge transformation.

The human eyes do not need to know the category of the image when segmenting the foreground object, but the foreground object can be segmented well only through the edge of the object. However, the existing image segmentation methods are all based on the category labeling of the image to supervise the segmentation network to segment the object of the corresponding category, and part of the capabilities of the segmentation network are used to identify the category of the object. In order to solve the problems that the deep learning network needs a lot of labeling and the existing segmentation network consumes a lot of capacity to identify the category of the object, the present application designs an image foreground segmentation algorithm based on edge knowledge transformation. In this algorithm, the knowledge of inner and outer edge segmentation in the existing open-source segmentation image dataset of a non-target category is used, and the knowledge of inner and outer edge segmentation in other images of the non-target category is transformed into the foreground segmentation of images of the target category by way of the adversary, thus realizing the image foreground segmentation guided by a very few target labeled samples.

The image foreground segmentation algorithm based on edge knowledge transformation includes the following steps:

1) Construction of an Image Segmentation Framework with Edge Self-Supervised Mechanism Based on selection of a DeepLabV3+ network as a main segmentation network, converting the input image to obtain $A*I$ by an affine transformation A for an input foreground segmentation image I of a target category; inputting both the original image I and the converted image $A*I$ into a basic segmentation network to obtain corresponding predicted segmentation results $F(I)$ and $F(A*I)$, and transforming the segmentation result $F(I)$ corresponding to the original image into $A*F(I)$ by the same affine transformation A; obtaining corresponding edge masks m and m' by subtracting a corrosion predicted segmentation result from an expansion predicted segmentation result for the transformed predicted segmentation result $A*F(I)$ corresponding to the original image and the segmentation result $F(A*I)$ corresponding to the converted image; constraining an edge segmentation result $m*A*F(I)$ corresponding to the original image to be consistent with an edge segmentation result $m'*F(A*I)$ corresponding to the affine-transformed image by using a $L_2$ normal form, $|m*A*F(I)-m'*F(A*I)|_2$, so that self-supervised information is formed to strengthen the segmentation consistency of the foreground segmentation network.

2) Construction of an Inner Edge and Outer Edge Discriminator

In order to realize the transformation of edge knowledge, firstly constructing a binary outer edge discriminator $D_{out}$, which is a general binary convolution neural network; obtaining a foreground object by using a corresponding label $m_o$ for an input image I' of a non-target category, using the outer edge discriminator $D_{out}$ to judge whether an edge of the foreground object contain background features, and the outer edge discriminator judging a formed triplet $\{I', m_o, m_o*I'\}$ to be true; then constructing a binary inner edge discriminator $D_{in}$, and obtaining a background part $(1-m_o)*I'$ by using an inverted label $1-m_o$ of the corresponding foreground object for the input image I' of a non-target segmentation category; using the inner edge discriminator $D_{in}$ to judge whether an edge of the background part contains foreground object features, and the inner edge discriminator $D_{in}$ judging a formed triplet $\{I', 1-m_o, (1-m_o)*I'\}$ to be true.

3) Generation of Pseudo-Segmented Triplet Data

In order to strengthen the ability of identifying whether the inner and outer edge discriminators $D_{in}$ and $D_{out}$ contain features outside the edge of the object or features inside the edge of the object, regarding the label $m_o$ and inverted label $1-m_o$ corresponding to the image I' of the non-target segmentation category in step 2), obtaining processed masks $\overline{m_o}$ and $\overline{1-m_o}$ through an expansion operation $\Gamma$ with a kernel radius r, forming an outer edge pseudo-segmented triplet $\{I', \overline{m_o}, \overline{m_o}*I'\}$ and an inner edge pseudo-segmented triplet $\{I', \overline{1-m_o}, (\overline{1-m_o})*I'\}$, and constraining the inner and outer edge discriminators $D_{in}$ and $D_{out}$ to discriminate the inner edge pseudo-triplet and outer edge pseudo-triplet to be false, so that the identification ability of the inner and outer edge discriminators is effectively strengthened.

4) Inner and Outer Edge Adversarial Foreground Segmentation Guided Based on a Very Few Labeled Samples of the Target Category In order to realize foreground segmentation guided by a very few labeled samples of the target category, employing a large amount of existing edge segmentation knowledge of open-source labeled image data to realize foreground segmentation of a target image; realizing the training of a target category segmentation network with a supervised loss for the labeled image of the target category; obtaining real inner and outer edge triplets and pseudo-segmented triplets through step 2) and step 3) for open-source image of a non-target category; obtaining predicted segmentation results of the target image through the segmentation network to form a triplet of the predicted segmentation results; transforming the edge knowledge of the open-source labeled image into the target category image segmentation by using the adversary between the segmentation network and the inner and outer edge discriminators, thereby finally realizing the image foreground segmentation guided by a very few target samples.

In some embodiments, the labeled samples of the target category in step 4) are less than 20.

In some embodiments, a specific way for the affine transformation A in step 1) is flipping and rotation.

The method of the present application is an image foreground segmentation algorithm based on edge knowledge transformation, which is used to realize the foreground segmentation of an image of a target category based on inner and outer edge knowledge transformation of an image of a non-target category in the form of an adversarial network under the guidance of a very few labeled samples (less than twenty) of the target category.

The method has the advantages that only less than twenty images of an target category are needed, and with the help of a lot of easily available open-source inner and outer edge knowledge of images of a non-target category, the segmentation effect close to the fully supervised segmentation depth network can be realized; in addition, the present application does not need a corresponding foreground segmentation network to waste the category identification ability for foreground objects, and only needs to perform foreground segmentation according to the edges of objects in the image, so as to realize image foreground segmentation closer to human vision.

BRIEF DESCRIPTION OF DRAWINGS

FIG. 1 is a frame diagram of the method of the present application, and the meanings of the signs in the diagram are as follows: I is an image of a target category, F is a segmentation network, A is an affine transformation, m is an edge mask, m' is an edge mask, I' is an image of a non-target category, $m_o$ is a foreground object label, $1-m_o$ is an inverted label, $\overline{m_o}$ is an object edge mask, $D_{in}$ is an inner edge discriminator and $D_{out}$ is an outer edge discriminator.

DESCRIPTION OF EMBODIMENTS

The image foreground segmentation algorithm based on edge knowledge transformation of the present application includes the following steps:

1) Construction of an Image Segmentation Framework with Edge Self-Supervised Mechanism In order to assist the foreground segmentation of the target category, the present application first needs to collect a large number of existing open-source image segmentation data sets, and the foreground segmentation data sets to be collected need to contain only one foreground in the sample image. For the existing complex data sets, a labeled category mask can be used as a reference screenshot part of the image, so as to only contain the foreground and background; the collected general foreground segmentation data should meet the diversity of sample categories, and the total sample size should be more than 5,000, and the more general samples, the better. On the basis of collecting a large number of auxiliary data sets, with respect to a large number of image data sets of a target category, in order to be able to conduct initial segmentation target guidance to the segmentation network, each category of foreground category image data that needs to be segmented is labeled with less than 20 samples. In addition, for these labeled image samples, the data can be enhanced by general data enhancement methods such as scaling, rotation, mirroring, adding noise, etc., and the target category guidance ability of the labels can be enhanced. Image-based foreground segmentation is realized, and a DeepLabV3+ network is selected as the main segmentation network F to realize the training of the segmentation network. The loss function mainly includes two parts: the supervision and constraint loss for a very few labeled samples; self-supervised mechanism constrains loss for unlabeled samples. For a very few labeled samples, the present application uses a cross entropy loss function to constrain the training segmentation network; for a large number of unlabeled samples, the present application adopts a self-supervised mechanism to realize the self-supervised training of the segmented network. In the edge self-supervised mechanism, for an input foreground segmentation image I of a target category, the input image is converted to obtain A*I by an affine transformation A such as flipping and rotation; both the original image I and the converted image A*I are input into a basic segmentation network to obtain corresponding predicted segmentation results F(I) and F(A*I), and the segmentation result F(I) corresponding to the original image is transformed into A*F(I) by the same affine transformation A; for both transformed predicted segmentation result A*F(I) corresponding to the original image and the segmentation result F(A*I) corresponding to the converted image, corresponding edge masks m and m' are obtained by subtracting a corrosion predicted segmentation result from an expansion predicted segmentation result; an edge segmentation result m*A*F(I) corresponding to the original image are constrained to be consistent with an edge segmentation result m'*F(A*I) corresponding to the affine-transformed image by using a $L_2$ normal form, $|m*A*F(I)-m'*F(A*I)|_2$, so that self-supervised information can be formed to strengthen the segmentation consistency of the foreground segmentation network.

2) Construction of an Inner Edge and Outer Edge Discriminator

In order to realize the transformation of edge knowledge, the present application adopts the form of an adversarial network. Different from the existing adversarial network to learn the consistency of image distribution or segmentation distribution, the present application designs an image segmentation network as a generation network. Among the two discriminators, i.e., the inner and outer edge discriminators, the outer edge discrimination network is used to judge whether the outer edge of the foreground object contains the features of the external background, and the inner edge discrimination network is used to judge whether the inner edge of the background contains the features of the internal object. For the outer edge discriminator, a general binary convolution neural network $D_{out}$ is selected in the present application, and for an input image I' of a non-target category, a foreground object is obtained by using a corresponding label $m_o$; the outer edge discriminator $D_{out}$ is used to judge whether an edge of the foreground object contain background features, and the outer edge discriminator judges a formed triplet {I', $m_o$, $m_o$*I'} to be true; similarly, a general binary convolutional neural network $D_{in}$ is selected as the inner edge discriminator, and the outer edge discriminator $D_{out}$ and the inner edge discriminator $D_{in}$ share the same network architecture but do not share parameters; for the input image I' of a non-target segmentation category, a background part $(1-m_o)$*I' is obtained by using an inverted label $1-m_o$ of the corresponding foreground object; the inner edge discriminator $D_{in}$ is used to judge whether an edge of the background part contains foreground object features, and the inner edge discriminator $D_{in}$ judges a formed triplet {I', $1-m_o$, $(1-m_o)$*I'} to be true.

3) Generation of Pseudo-Segmented Triplet Data

In order to strengthen the ability of identifying whether the inner and outer edge discriminators $D_{in}$ and $D_{out}$ contain features outside the edge of the object or features inside the edge of the object, regarding the label $m_o$ and inverted label $1-m_o$ corresponding to the image I' of the non-target segmentation category in step 2), processed masks $\overline{m_o}$ and $\overline{1-m_o}$ are obtained through an expansion operation $\Gamma$ with a kernel radius r, an outer edge pseudo-segmented triplet {I', $\overline{m_o}$, $\overline{m_o}$*I'} and an inner edge pseudo-segmented triplet {I', $\overline{1-m_o}$, $(\overline{1-m_o})$*I'} are formed, and the inner and outer edge discriminators $D_{in}$ and $D_{out}$ are constrained to discriminate the inner edge pseudo-triplet and outer edge pseudo-triplet to be false, which can effectively strengthen the identification ability of the inner and outer edge discriminators.

4) Inner and Outer Edge Adversarial Foreground Segmentation Guided Based on a Very Few Labeled Samples of the Target Category In order to realize foreground segmentation guided by a very few labeled samples (less than twenty) of the target category, a large amount of existing edge segmentation knowledge of open-source labeled image data can be employed to realize foreground segmentation of a target image; for the labeled image of the target category, the training of a target category segmentation network is realized with a cross entropy loss function; for open-source image of a non-target category, real inner and outer edge triplets and pseudo-segmented triplets are obtained through step 4) and step 5); predicted segmentation results of the target image are obtained through the segmentation network to form a triplet of the predicted segmentation results; the edge knowledge of the open-source labeled image is transformed into the target category image segmentation by using the adversary between the segmentation network and the inner and outer edge discriminators, and finally realizing the image foreground segmentation guided by a very few target samples.

The method of the present application is an image foreground segmentation algorithm based on edge knowledge transformation, which is used to realize the target category image foreground segmentation based on inner and outer edge knowledge transformation of non-target category images in the form of an adversarial network under the guidance of a very few (less than twenty) labeled samples of the target category.

The method has the advantage that only less than twenty target category images are needed, and with the aid of a lot of easily available open-source inner and outer edge knowledge of images of non-target categories, the segmentation effect close to a fully supervised segmentation depth network can be realized; in addition, the present application does not need a corresponding foreground segmentation network to waste the category identification ability for foreground objects, and only needs to perform foreground segmentation according to the edges of objects in the image, so as to realize image foreground segmentation closer to human vision.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

Through the above steps, by using a large number of open-source labeled samples of non-target categories, the foreground segmentation of an image of a target category based on the knowledge transformation of inner and outer edges can be realized by way of adversary under the guidance of a very few (less than twenty) labeled samples of the target category.

The content described in the examples of this description is only an enumeration of the implementation forms of the inventive concept, and the protection scope of the present application should not be regarded as limited to the specific forms stated in the examples, and the equivalent technical means that can be conceived by those skilled in the art according to the inventive concept shall also be included in the protection scope of the present application.

What is claimed is:

1. An image foreground segmentation algorithm based on edge knowledge transformation, comprising the following steps:

1) construction of an image segmentation framework with edge self-supervised mechanism;

based on selection of a DeepLabV3+ network as a main segmentation network, converting an original image to obtain A*I by an affine transformation A for the original image I of a target category; inputting both the original image I and the converted image A*I into the main segmentation network to obtain corresponding predicted segmentation results F(I) and F(A*I), and transforming the segmentation result F(I) corresponding to the original image into A*F(I) by the same affine transformation A; obtaining corresponding edge masks m and m' by subtracting a corrosion predicted segmentation result from an expansion predicted segmentation result for the transformed predicted segmentation result A*F(I) corresponding to the original image and the segmentation result F(A*I) corresponding to the converted image; constraining an edge segmentation result m*A*F(I) corresponding to the original image to be consistent with an edge segmentation result m'*F(A*I) corresponding to the affine-transformed image by using a $L_2$ normal form, $|m*A*F(I)-m'*F(A*I)|_2$, so that self-supervised information is formed to strengthen the segmentation consistency of the main segmentation network;

2) construction of an inner edge and outer edge discriminator;

in order to realize the transformation of edge knowledge, firstly constructing a binary outer edge discriminator $D_{out}$, which is a general binary convolution neural network; obtaining a foreground object by using a corresponding label $m_o$ for an input image I' of a non-target category; using the outer edge discriminator $D_{out}$ to judge whether an edge of the foreground object contain background features, and the outer edge discriminator judging a formed triplet $\{I', m_o, m_o*I'\}$ to be true; then constructing a binary inner edge discriminator $D_{in}$, and obtaining a background part $(1-m_o)=I'$ by using an inverted label $1-m_o$ of the corresponding foreground object for the input image I' of a non-target segmentation category; using the inner edge discriminator $D_{in}$, to judge whether an edge of the background part contains foreground object features, and the inner edge discriminator $D_{in}$ judging a formed triplet {I', $\overline{1-m_o}$, $(\overline{1-m_o})*I'$} to be true;

3) generation of pseudo-segmented triplet data;

in order to strengthen the ability of identifying whether the inner and outer edge discriminators $D_{in}$ and $D_{out}$ contain features outside the edge of the object or features inside the edge of the object regarding the label $m_o$ and inverted label $1-m_o$ corresponding to the image I' of the non-target segmentation category in step 2), obtaining processed masks $\overline{m_o}$ and $\overline{1-m_o}$ through an expansion operation Γ with a kernel radius r, forming an outer edge pseudo-segmented triplet {I', $\overline{m_o}$, $\overline{m_o}*I'$} and an inner edge pseudo-segmented triplet {I', $\overline{1-m_o}$, $(\overline{1-m_o})*I'$}, and constraining the inner and outer edge discriminators $D_{in}$ and $D_{out}$ to discriminate the inner edge pseudo-triplet and outer edge pseudo-triplet to be false, so that the identification ability of the inner and outer edge discriminators is effectively strengthened;

4) inner and outer edge adversarial foreground segmentation guided based on labeled samples of the target category;

employing an amount of existing edge segmentation knowledge of open-source labeled image data to realize foreground segmentation of a target image, in order to realize foreground segmentation guided by labeled samples of the target category; realizing the training of a target category segmentation network by a supervised loss for the labeled image of the target category; obtaining real inner and outer edge triplets and pseudo-segmented triplets through step 2) and step 3) for open-source image of a non-target category; obtaining predicted segmentation results of the target image through the segmentation network to form a triplet of the predicted segmentation results; transforming the edge knowledge of the open-source labeled image into the target category image segmentation by using the adversary between the segmentation network and the inner and outer edge discriminators, and finally realizing the image foreground segmentation guided by target samples.

2. The image foreground segmentation algorithm based on edge knowledge transformation according to claim 1, wherein the labeled samples of the target category in step 4) are less than 20.

3. The image foreground segmentation algorithm based on edge knowledge transformation according to claim 1, wherein a specific way for the affine transformation A in step 1) comprises flipping and rotation.

* * * * *